(No Model.)

K. BEEGER.
Velocipede.

No. 233,396. Patented Oct. 19, 1880.

Witnesses:
W. Colborne Brookes,
Charles C. Stetson.

Inventor:
Karl Beeger,
by his attorney, Thomas D. Stetson.

UNITED STATES PATENT OFFICE.

KARL BEEGER, OF BERLIN, PRUSSIA, GERMANY, ASSIGNOR TO HIMSELF AND GUSTAV LIEDMAN, OF SAME PLACE.

VELOCIPEDE.

SPECIFICATION forming part of Letters Patent No. 233,396, dated October 19, 1880.

Application filed June 28, 1880. (No model.)

*To all whom it may concern:*

Be it known that I, KARL BEEGER, of the city of Berlin, Prussia, and a citizen of the German Empire, have invented Improvements in Velocipedes, of which the following is a specification.

This invention relates to that class of velocipedes or vehicles driven by human power, in which the moving power, composed of the weight of the body and the exertion of the muscle of one or more persons, is applied through the medium of a seat vibrating on a pivot; and it consists of a system of lazy-tongs, a crank-shaft, and gearing.

Figure 1:
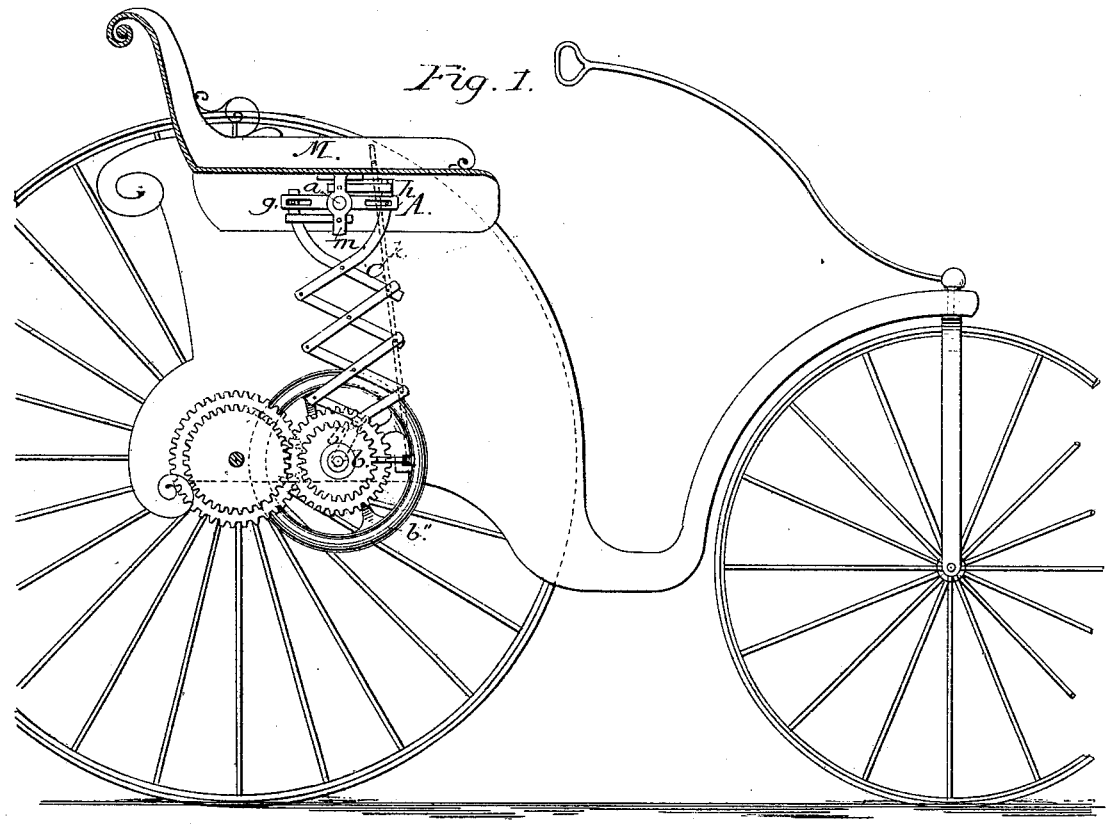
Figure 2:
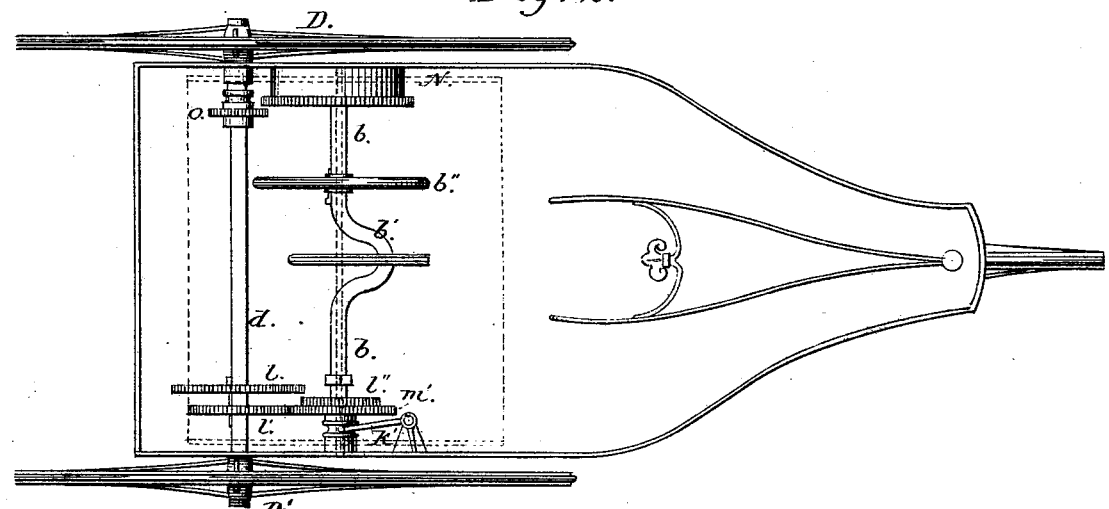

In the accompanying drawings, Figure 1 is partly a vertical longitudinal section and partly a side view. Fig. 2 is a plan of the machine.

Similar letters of reference indicate like parts in both the figures.

The seat M, vibrating loosely on a rod, $a$, fixed to the frame-work A of the vehicle, lengthens and shortens the lazy-tongs C by means of the connecting-rods $g$ $h$, pivoted to the arm $m$, which vibrates together with the seat M, to which it is fastened.

The end of the lazy-tongs C is attached to the crank $b'$ of the shaft $b$. Suppose a person sitting on the seat M imparts to the latter a rocking motion by throwing the upper part of the body alternately backward and forward, the crank $b'$ of the shaft $b$ will be turned round, the fly-wheel $b''$ securing the overcoming of the dead-points. This rotary motion is transmitted, by the spur-wheels $l'$ $m'$, to the main shaft or axle $d$, to which one of the running-wheels D is fixed, while the other, D', is loose on it.

Besides the gearing $l$ $m'$, purchased 1 to 1, is arranged a second pair of gear-wheels, $l$ $l''$, the purchase of which is such that the shaft $d$ makes less revolutions than the shaft $b$, and which is used in starting the vehicle or in ascending elevations of the road. As soon as the vehicle is in motion the gears $l$ $l''$ are thrown out and those $l'$ $m'$ in gear, by shifting $l''$ and $l$ along the shaft $b$. This is accomplished by means of the shifting-lever K' and the hand-lever K, which latter is in reach of the riding person.

For any emergency, as for ascending very steep hills or for other purposes, another pair of gear-wheels, driven by a spring, is mounted on the shafts $b$ and $d$.

The spring-barrel N is mounted on a sleeve surrounding the shaft $b$, and a small pinion, $o$, which can be thrown in and out of gear at will, slides on the shaft $d$, governed, also, by a lever (not shown) in reach of the riding person, which, when the spring is run down, must wind it up again. The spring is equipped with suitable means for holding and releasing it. The details of this arrangement are not shown in the drawings, as they may be of common well-known construction. In front is provided for common road use a steering-wheel of the common type, which may be dispensed with for railways. In this latter case a two-wheeled truck is employed instead of a steering apparatus, and both driving-wheels, D and D', are fixed to the shaft or axle $d$.

Be it further understood that the seat M may be constructed as a single or double one, so as to serve for one or more persons, and that the form and construction of the vehicle may be altered, according to the purpose for which it is to be used. It may have smooth-faced wheels for common roads, or flanged wheels for tramway or railway use.

What I desire to secure by Letters Patent is—

1. The combination of the single or double seat M, vibrating on the rod $a$, and the lazy-tongs C, crank-shaft $b$, geared with shaft or axle $d$, for actuating one or more driving-wheels, D D', of a vehicle, substantially as set forth.

2. The combination, in a vehicle having the crank-shaft $b$ $b'$, suitable seat and gear connections, with the shaft $d$, of a spring-motor, $n$, geared to the pinion $o$, as shown and described.

3. In a vehicle for general locomotion, the vibrating seat, actuated as described, the lazy-tongs, crank-shaft, and gearing, all combined to operate substantially as described.

This specification signed by me this 28th day of May, 1880.

KARL BEEGER.

Witnesses:
CARL T. BURRHARDT,
BERTHOLD ROI.